(12) United States Patent
Hu et al.

(10) Patent No.: US 7,403,528 B2
(45) Date of Patent: Jul. 22, 2008

(54) METHOD OF DATA COMMUNICATION USING A CONTROL MESSAGE

(75) Inventors: Teck H. Hu, Budd Lake, NJ (US); Gordon Peter Young, Bracknell (GB)

(73) Assignee: Lucent Technologies Inc., Murray Hill, NJ (US)

( * ) Notice: Subject to any disclaimer, the term of this patent is extended or adjusted under 35 U.S.C. 154(b) by 1178 days.

(21) Appl. No.: 10/243,443

(22) Filed: Sep. 13, 2002

(65) Prior Publication Data

US 2004/0052250 A1    Mar. 18, 2004

(51) Int. Cl.
- H04Q 7/00    (2006.01)
- H04Q 7/28    (2006.01)
- H04L 12/28   (2006.01)
- G06F 11/00   (2006.01)
- G06C 25/02   (2006.01)

(52) U.S. Cl. ............... 370/394; 370/341; 370/328; 714/748; 714/55

(58) Field of Classification Search ........... 370/235, 370/393, 394, 428, 429, 230, 231, 236, 216, 370/218; 714/746, 748, 749
See application file for complete search history.

(56) References Cited

U.S. PATENT DOCUMENTS

| | | | |
|---|---|---|---|
| 5,781,598 A | 7/1998 | Hardy, III | 375/372 |
| 5,918,002 A | 6/1999 | Klemets et al. | 395/182.16 |
| 6,085,252 A | 7/2000 | Zhu et al. | 709/231 |
| 6,424,625 B1 | 7/2002 | Larsson et al. | 370/236 |
| 6,791,945 B1* | 9/2004 | Levenson et al. | 370/235 |
| 6,901,063 B2* | 5/2005 | Vayanos et al. | 370/335 |
| 6,931,569 B2* | 8/2005 | Fong et al. | 714/18 |
| 6,980,514 B2* | 12/2005 | Grob et al. | 370/230 |
| 7,035,214 B1* | 4/2006 | Seddigh et al. | 370/231 |
| 7,069,490 B2* | 6/2006 | Niu et al. | 714/748 |
| 7,187,677 B2* | 3/2007 | Torsner et al. | 370/394 |

FOREIGN PATENT DOCUMENTS

WO    WO 00/20974    4/2000

OTHER PUBLICATIONS

T.H. Hu et al., Pending U.S. Appl. No. 09/994,490, filed Nov. 26, 2001.
European Search Report.

* cited by examiner

Primary Examiner—Hanh Nguyen

(57) ABSTRACT

A method of data communication. The method includes transmitting a control message identifying missing data as lost by the transmitter prior to the expiration of a timer. The missing data may include at least one data packet such that the control message identifies the at least one missing data packet. The control message may include a field and/or an acknowledge sequence number for identifying the missing data packet. The control message also may include a packet data unit having a dummy payload and/or a zero payload. The control message communicates to the receiver that the transmitter has aborted the transmission and/or retransmission of the one or more missing data packets. The control message may be communicated to the receiver over the same data channel used for transmitting the data packets, or alternatively, a wholly different channel than the data channel.

20 Claims, 3 Drawing Sheets

METHOD OF DATA COMMUNICATION USING A CONTROL MESSAGE

BACKGROUND OF THE INVENTION

I. Field of the Invention

The present invention relates to networks and telecommunications, and more particularly to the communication of data.

II. Description of the Related Art

Wireless communications systems employ a number of geographically distributed, cellular communication sites or base stations. Each base station supports the transmission and reception of communication signals to and from stationary or fixed, wireless communication devices or units. Each base station handles communications over a particular region commonly referred to as a cell/sector. The overall coverage area for a wireless communications system is defined by the union of cells for the deployed base stations. Here, the coverage areas for adjacent or nearby cell sites may overlap one another to ensure, where possible, contiguous communications coverage within the outer boundaries of the system.

When active, a wireless unit receives signals from at least one base station over a forward link or downlink and transmits signals to at least one base station over a reverse link or uplink. There are many different schemes for defining links or channels for a cellular communication system, including, for example, TDMA (time-division multiple access), FDMA (frequency-division multiple access), and CDMA (code-division multiple access) schemes. In CDMA communications, different wireless channels are distinguished by different channelization codes or sequences that are used to encode different information streams, which may then be modulated at one or more different carrier frequencies for simultaneous transmission. A receiver may recover a particular stream from a received signal using the appropriate code or sequence to decode the received signal.

For voice applications, conventional cellular communication systems employ dedicated links between a wireless unit and a base station. Voice communications are delay-intolerant by nature. Consequently, wireless units in wireless cellular communication systems transmit and receive signals over one or more dedicated links. Here, each active wireless unit generally requires the assignment of a dedicated link on the downlink, as well as a dedicated link on the uplink.

With the explosion of the Internet and the increasing demand for data, resource management has become a growing issue in cellular communication systems. Next generation wireless communication systems are expected to provide high rate packet data services in support of Internet access and multimedia communication. Unlike voice, however, data communications may be relatively delay tolerant and potentially bursty in nature. Data communications, as such, may not require dedicated links on the downlink or the uplink, but rather enable one or more channels to be shared by a number of wireless units. By this arrangement, each of the wireless units on the uplink competes for available resources. Resources to be managed in the uplink include the received power at the base station, and the interference created by each user to other users in the same sector or cell, as well as in other sectors or cells, for example. This is in contrast to the resources to be managed on the downlink, including fixed transmit power budgets.

While data communications may be relatively delay tolerant and potentially bursty in nature, one problem expected in the next generation wireless communication systems is failed data block or data packet transmission. More particularly, a base station, for example, may unsuccessfully transmit one or more data packets from a number of packets to an identified wireless unit. As a result of this failure, the base station may use any number of retransmission techniques, such as hybrid automatic repeat request ("HARQ"), for example, to deliver the data packet(s) not satisfactorily received by the wireless unit. While the base station attempts retransmission of previously unsuccessful transmitted packets, other data packets may be, however, subsequently transmitted to the wireless unit.

In High Speed Downlink Packet Access ("HSDPA") systems, each wireless unit employs a timer set by the base station. Packet data is sent from the base station to the wireless unit in a sequential manner. Upon satisfactory reception, the wireless unit delivers the packet data from its buffer for processing in the same sequential order. If, during reception, the wireless unit determines that a gap in the sequence order of the received data packets has occurred, the wireless unit then starts a timer for the missing data packet(s). The timer provides a time window in which the wireless unit waits for the satisfactory reception of each data packet, perceived as missing, by transmission and/or a retransmission scheme(s). If the retransmission scheme fails to satisfactorily deliver the missing data packet(s) to the wireless unit before the timer window passes, the wireless unit assumes the packet(s) to be lost.

Data packets may be lost for various reasons. In one scenario, the base station may determine that the maximum retransmission attempts for a data packet have been exceeded and no further retransmission are permissible. Secondly, the base station may decide to unilaterally abort the transmission or retransmission of the data packet(s). Thirdly, the base station may determine that its resources are needed for a higher priority customer(s) or higher priority data, and therefore may terminate the transmission and/or retransmission of the "missing" data packet. Fourthly, the wireless unit may receive the transmitted data packet with an error. Here, the wireless unit transmits a NACK (e.g., a negative acknowledgment to indicate reception of a data packet with errors), though the base station mistakenly receives an ACK (e.g., a positive acknowledgment indicating the wireless unit received the data packet satisfactorily) instead and, thusly, no retransmission will occur in the base station.

Consequently, in HSDPA systems, the base station may determine the missing one or more data packets as lost at any point of the transmission and/or retransmission. In contrast, however, the wireless unit will not ascertain the missing data packet(s) as lost until after the timer expires. Consequently, the wireless unit has to wait until the timer expires before processing the received data packets, and/or attempting to recover the lost packet(s) by various other techniques. This delay or waiting time for the timer to expire is sometimes referred to as a stall period.

The length of the stall period may be relatively substantial in time. The base station may determine the missing packet as lost by, for example, aborting its retransmission or determining to serve higher priority customer(s) or higher priority data, in significantly less time than the setting of the timer by the base station. It should be noted that the timer is initially set conservatively such that the wireless unit may handle a predetermined number of retransmission attempts for missing data packets. Due to the randomness of the completion time of each transmission, the time to complete a designated number of retransmission attempts may vary. Consequently, the timer is set conservatively so that valid transmissions may not be terminated prematurely.

As a result of the hereinabove, a demand exists for a method supportive of efficient, high-speed data communications that avoids or minimizes unnecessary delays. Moreover, a need exists for a method of minimizing the stall period in wireless units.

SUMMARY OF THE INVENTION

The present invention provides a method for data communication that minimizes the stall period in networks and telecommunications. More particularly, the present invention provides a method of transmitting a control message from a transmitter, such as a base station, for example, informing the receiver, such as a wireless unit, for example, that missing data has been lost. The control message may also communicate that the transmitter has aborted transmitting and/or retransmitting the lost data. For the purposes of the present invention, a control message may be a signal identifying the data determined as lost by the transmitter. The control message may comprise a field for identifying the lost packet. Furthermore, the control message may comprise a control packet data unit ("PDU") having a dummy or zero payload.

In an embodiment of the present invention, a control message is transmitted from a base station informing a wireless unit that one or more missing data packets have been lost. The control message identifies the lost data packet(s). Once the control message is received, a timer started within the wireless unit for identified missing packet(s) may be stopped and reset. The wireless unit may then treat the received data packets in its buffer as if these data packets have been received and process the remaining data packets, received in sequence, in the buffer as normal. With the timer reset, the wireless unit may begin processing the data packets it has received and stored in its buffer, and/or attempt other methods to recover the lost packet(s).

In another embodiment of the present invention, a communications device comprises a buffer for storing received data packets. The communications device also comprises a processing unit for transferring the stored data packets from the buffer after any timer for a missing data packet(s) expires. The processing unit also may determine if one ore more data packets are missing. In response to receiving a control message before the timer expires, the processing unit may transfer the stored data packets from the buffer and deem the data packet(s) identified in the control message as lost.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

The present invention provides a method for data communication that minimizes a stall period in networks and telecommunications. A stall period corresponds to a delay waiting for a timer in the receiver to expire. The timer in the receiver may be set by a transmitter, and functionally establishes a window in which data perceived to be missing by the receiver, after the expiration of the timer is deemed lost. The present invention minimizes stall periods through the use of a control message. For the purposes of the present invention, a control message may be a signal identifying the missing data as lost and/or aborted by the transmitter.

Figure 1:
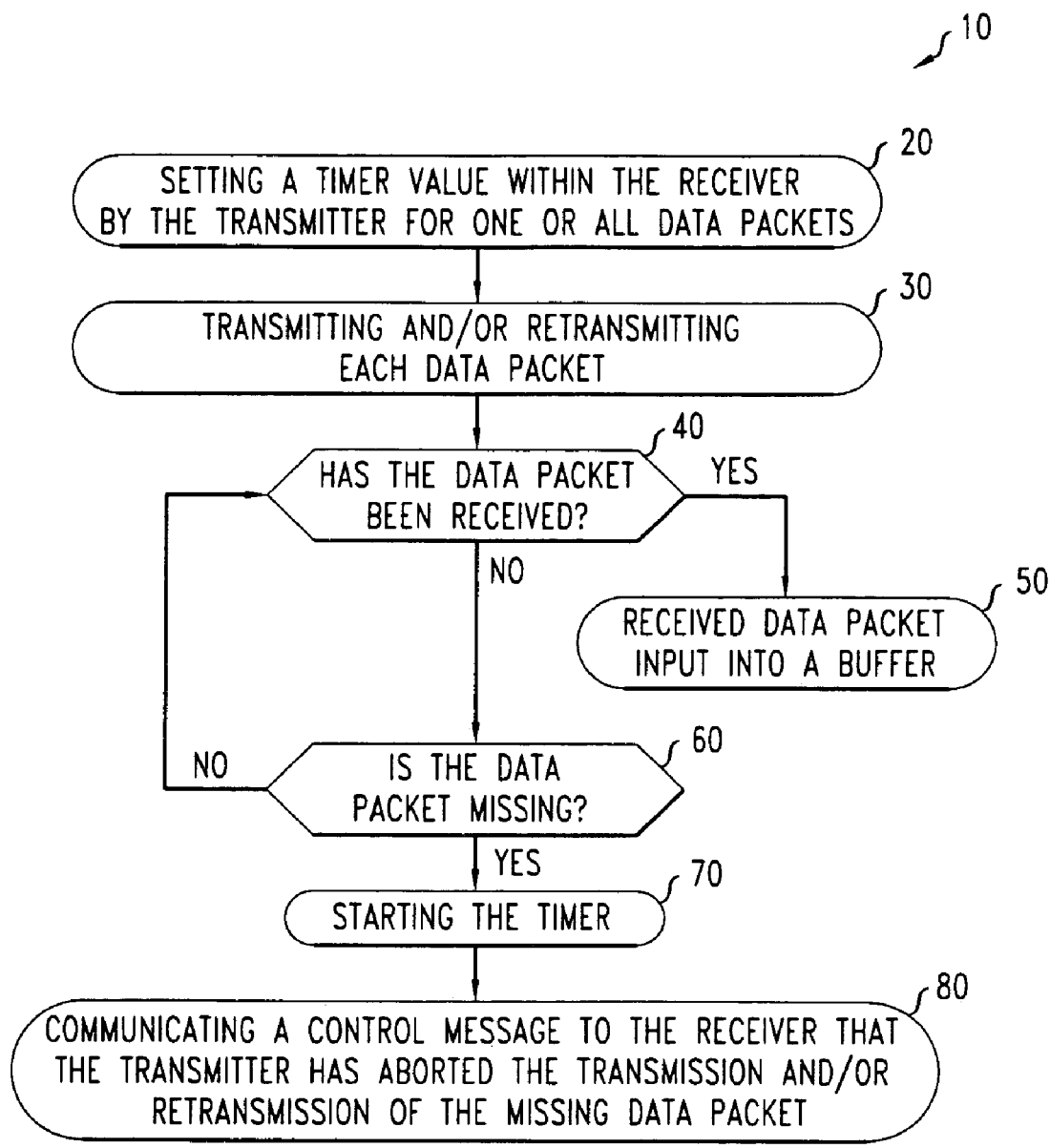
FIG. 1 depicts an embodiment of the present invention.

Referring to FIG. 1, a flow chart depicting one embodiment of the present invention is illustrated. More particularly, a method (10) is depicted for minimizing stall periods in the communication of data, configured in the form of packets, for example, through a network(s). For the purposes of the present invention, the term data refers to data packet(s), data bit(s), symbol(s), and/or a stream of information comprising packets, bits, and/or symbols. It should also be noted that the term networks may includes wired and wireless communication systems.

Initially, a timer for a transmitted data packet(s) that is perceived lost at the receiver is sent to the receiver by the network (20). The transmitter of the data packets, such as a base station, for example, may set the timer. Moreover, the timer may reside in the receiver, such as a wireless unit, for receiving each retransmitted data packet. The timer's setting may take into account various conditions and/or considerations, including the base station's resources, the system delay, as well as the attenuation patterns of the air interface, for example. The timer may also be set to afford the wireless unit the opportunity to handle a designated number of retransmission attempts for data packets viewed as missing by the wireless unit, thereby insuring that valid transmissions are not prematurely terminated.

Thereafter, the base station begins transmitting each data packet (30). This transmitting step may include a retransmission step, in the event the data packet is not received satisfactorily in the initial transmission. In this scenario, the data packet is not correctly received by the wireless unit in the initial transmission. Consequently, the wireless unit transmits back a NACK—as opposed to an ACK if the data packet is received correctly—to the base station. In response to the NACK, the base station may use one of a number of retransmission schemes, including HARQ, for example, to retransmit the data packet over communication link, such as the physical layer.

The method, thereafter, includes a step for determining whether the transmitted data packet has been received (40). Here, each received data packet is input into a buffer (50). These data packets may be received through the initial transmission or retransmission steps, detailed hereinabove.

The data packets to be transmitted, however, may have a designated sequence. The buffer is configured to store each data packet, once received, according the designated sequence of the packets themselves. The wireless unit, however, may not receive the packets in the designated sequence for various reasons, including attenuation patterns in the air interface, available base station resources, transmission delays, other base station delays, as well as errors in transmission, for example. Thusly, the method includes a step for determining whether the data packet(s) is missing (60). If the data packet(s) is not missing, a feedback loop returns to the step of determining whether the transmitted data packet has been received (40).

As the data packets may be received out of sequence, the buffer allocates a memory location for each data packet. More particularly, the buffer keeps an allocated memory location open for a data packet that is late in arrival. A data packet may be viewed as late if it is received out of sequence with respect to the other received data packets. While the buffer waits for late data packet, the timer, initially set by the transmitting base station, is started in a subsequent step (70) and begins to count down. Should the timer expire before the late data packet arrives, the wireless unit may determine the data packet as lost. This waiting period for the expiration of the timer—commonly referred to as the stall period—may be a bottleneck for certain data applications supported by HSDPA systems, for example.

The base station, during this stall period, however, may already have determined the missing data packet as lost, unbeknownst to the wireless unit. The missing data packet may be lost as a result of an error(s) created by the base station after a maximum number of retransmission attempts for the data packet have been exceeded. The missing data packet may also be lost as a result of the base station deciding to abort the transmission or retransmission of the data packet. The base station may also determine that its resources are needed to serve a higher priority customer(s) or higher priority data, and therefore may be forced to terminate the transmission and/or retransmission of the "missing" data packet. Moreover, the wireless unit may receive the transmitted data packet with an error and transmit back a NACK to the base station. Here, though the base station mistakenly receives an ACK (e.g., a positive acknowledgment) instead.

In the event the base station has determined the missing data packet as lost, the method includes the step of transmitting a control message to the wireless unit (80). The control message communicates to the wireless unit that the base station has aborted transmitting and/or retransmitting of the data packet. As a result of receiving the control message, the wireless unit need not wait for the expiration of the timer, thereby expediting the communication of data. In response to receiving the control message, the wireless unit may transfer the received data packets stored within its buffer for processing and/or attempt to recover the lost packet by various other techniques. These techniques may include utilizing the radio link control ("RLC") layer, for example.

The control message identifies a data packet(s) to the wireless unit that as no longer being transmitted and/or retransmitted—i.e., aborted. This information may be communicated between the base station and the wireless unit using various different configurations, as detailed hereinbelow. For example, the control message may comprise a field for identifying the missing data packet and/or a header component including an acknowledge sequence number ("ASN") for identifying the data packet aborted by the base station.

It should be noted that the control message might be merely a signal communicated over a distinct channel. In this scenario, a data channel may be used for transmitting and/or retransmitting the data packets. The channel used for transmitting the control message to the wireless unit, in this example, is different channel than the data channel.

Under certain circumstances, the base station may fail to determine the missing data packet as lost, even though the data packet is missing. Here, instead of waiting for the control message, the wireless unit waits for the stall period to expire. Thereafter, the wireless unit transfers the received data packets stored in its buffer for subsequent processing and/or attempts recovering the lost packet by various other techniques, such as using the RLC layer, for example.

Figure 2:
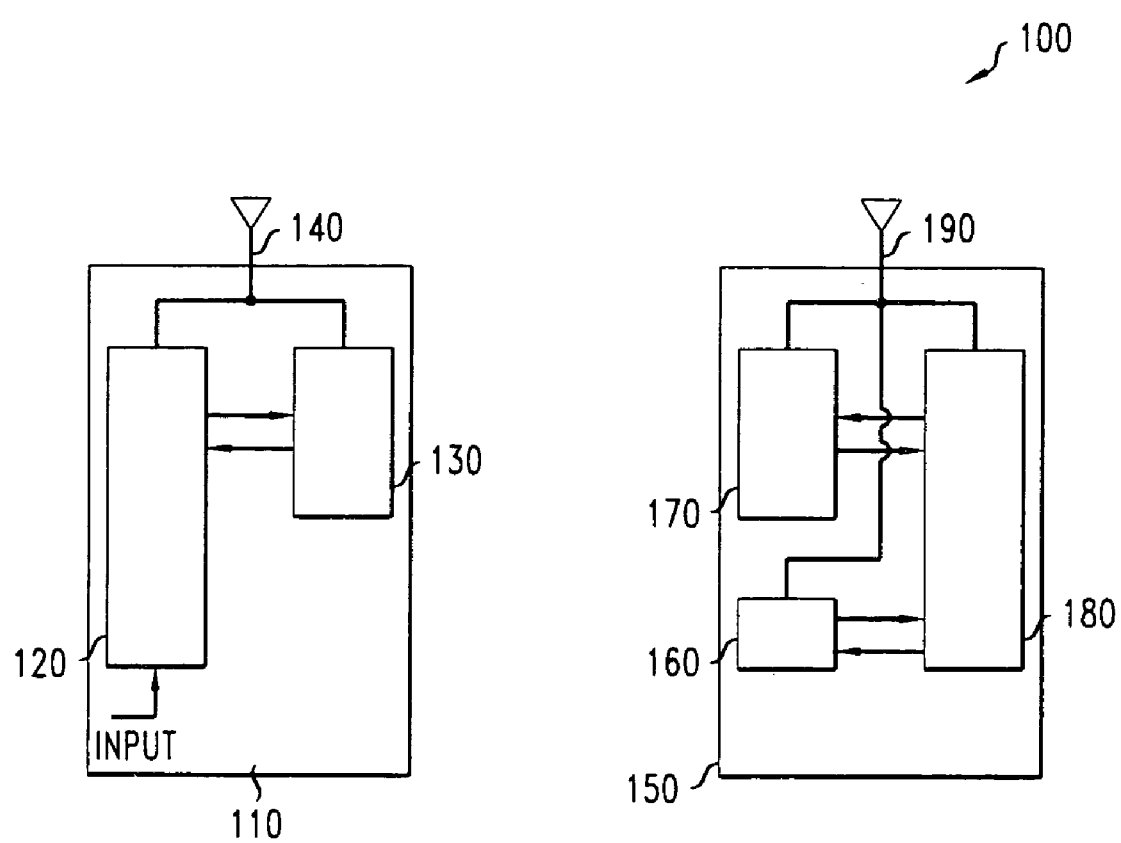
FIG. 2 depicts another embodiment of the present invention.

Referring to FIG. 2, another embodiment of the present invention is illustrated. Here, a wireless communications system 100 is depicted having a first transceiver 110 and a second transceiver 150. For the purposes of the simplicity, first transceiver 110 is a base station and second transceiver 150 is a wireless unit.

Base station 110 comprises a processing unit 120 for packetizing incoming data. These resultant data packets are thereafter fed into a buffer 130. Buffer 130 stores the data packets in a sequence determined by processing unit 120 for subsequent transmission by means of an antenna structure 140. Transmission of the data packets may also be scheduled by processing unit 120. Processing unit 120 also establishes a time window in which wireless unit 150 may wait for each missing data packet transmitted from base station 110. The time window is also transmitted through antenna structure 140. Furthermore, processing unit 120 generates a control message transmitted through antenna structure 140 if base station 110 decides to abort the transmission and/or retransmission of one or more data packets. The control message, as generated, may include information regarding the identity of the data packet missing that is to be aborted. This identification information may be realized by an ASN generated by processing unit 120.

Wireless unit 150 comprises an antenna structure 190 for receiving the timing window from base station 110. The timing window is subsequently fed into a timer 160. Moreover, the data packets, as transmitted from base station 110, are also received through antenna structure 190. Each data packet is stored in a buffer 170 according to the sequence determined by processing unit 120 of base station 110. Headers found on the data packets may determine the sequence in which the received packets are stored in buffer 170.

Wireless unit also comprises a processing unit 180. If the time window in timer 160 expires, processing unit 180 transfers the stored in sequence packets from buffer 170 for subsequent processing. Moreover, processing unit 180 determines if at least one data packet is missing in buffer 170 and waits for either the timer to expire or the receipt of a control message identifying the missing data packet as aborted. If the control message is received before the timer expires, the processing unit 180 transfers stored packets from buffer 170 for subsequent processing and/or attempts recovery of the lost packet by various other techniques, such as using the RLC layer, for example. By enabling the control message to expedite subsequent processing and/or attempts recovery, wireless communications system 100 communicates supports higher speed data communication because potential stall periods are minimized.

By utilizing the control message in communication system 100, various features may be realized. Firstly, communication system 100 should have a minimized stall period. This is because abortions by base station 110 are communicated to the wireless unit and the aborted data packet may be forwarded to an upper communications layer, such as the RLC, to minimize stalling.

Secondly, communication system 100 should be more efficiently using its resources. If the control message comprises a PDU having a dummy or zero payload, the taxation on system 100 should be minimized in the event a missing data packet is aborted. This is based on the PDU's insignificant size.

Thirdly, base station 110 may transmit the control message employing the PDU if there are no downlink transmissions scheduled for other wireless units and wireless unit 150 in which data packet is missing. This coincides with a low load scenario in which incoming data packets may not be sufficient to help flush the stalled data blocks in buffer 170 of wireless unit 150—also the scenario if stall improvement is a high priority. Moreover, if employing a PDU, the control message may offer comparative robustness because of in-band signaling. The control message should expedite the identification of an aborted data packet(s).

Figure 3A:
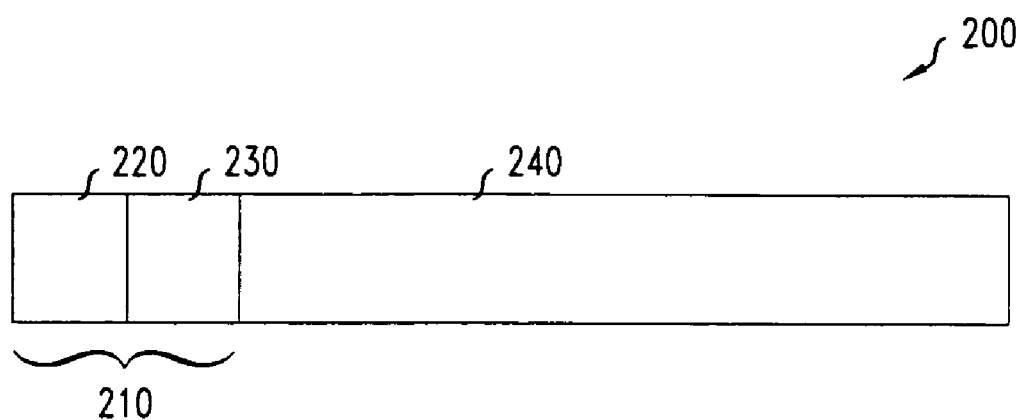
FIGS. 3(*a*) and 3(*b*) depict other embodiments of the present invention.
Figure 3B:
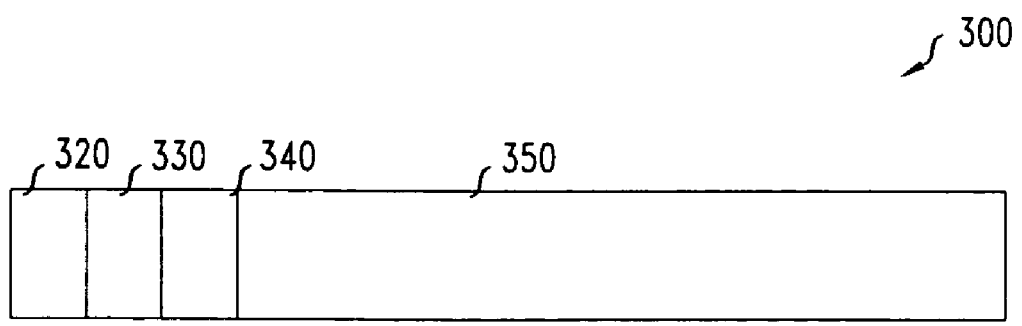

Referring to FIG. 3(*a*), a first format of a control message 200 is illustrated. Control message 200 comprises a header 210 and a payload 240. Header 210 includes an initial header 220 comprising a transmission sequence number ("TSN") for identifying payload 240 within the sequence of data packets being communicated. Moreover, header 210 also includes a secondary header 230 comprising an ASN for identifying a data packet that has been aborted by the base station.

Referring to FIG. 3(*b*), a second format of a control message 300 is illustrated. Here, control message 300 comprises a header 320, a series of fields, 330 and 340, as well as a control PDU 350 having a dummy or zero payload. Header 320 may include an ASN for identifying a data packet that has been aborted by the base station. Consequently, control message 300 may require fewer headers—if used at all—than the control message 200. If fields 330 and/or 340 identify an aborted data packet, however, header 320 may serve another function. It should be noted that control message 300 may simply comprise a signal configured in format other than a packet. In that regard, control message 300 may be transmitted over a different channel than the data channel employed in the transmission and reception of the data packets.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as network elements, the wireless unit, the base station, a base station controller, a mobile switching center and/or a radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method of data communication between at least one base station and at least one wireless unit, comprising:
    staffing a timer in the wireless unit in response to determining that at least one packet is missing; and
    transmitting a control message by the base station and received by the wireless unit identifying missing data as lost to the wireless unit prior to an expiration of the timer in the wireless unit.

2. The method of claim 1, wherein the missing data comprises at least one data packet, and the control message identifies the at least one missing data packet.

3. The method of claim 2, wherein the control message comprises a field and/or an acknowledge sequence number for identifying the missing data packet.

4. The method of claim 2, wherein the control message comprises a packet data unit having a dummy payload and/or a zero payload.

5. The method of claim 2, wherein the control message communicates an abortion in transmitting and/or retransmitting by a transmitter of the at least one missing data packet.

6. The method of claim 2, wherein a data channel is allocated for the transmission and/or retransmission of the at least one missing data packet, and the control message is transmitted over a different channel than the data channel.

7. A method of data communication between at least one base station and at least one wireless unit comprising:
    starting a timer in the wireless unit in response to determining that at least one packet is missing; and
    receiving a control message by the wireless unit and transmitted by the base station identifying missing data as lost to the wireless unit prior to an expiration of the timer in the wireless unit.

8. The method of claim 7, wherein the missing data comprises at least one data packet, and the control message identifies the at least one missing data packet.

9. The method of claim 8, wherein the control message comprises a field and/or an acknowledge sequence number for identifying the missing data packet.

10. The method of claim 8, wherein the control message comprises a packet data unit having a dummy payload and/or a zero payload.

11. The method of claim 8, wherein the control message communicates to a receiver an abortion in transmitting and/or retransmitting of the at least one missing data packet.

12. The method of claim 11, further comprising:
    transferring received data packets stored in a buffer for processing in response to receiving the control message.

13. The method of claim 11, further comprising:
    attempting recovery of the at least one missing data packet using a radio link control layer.

14. The method of claim 8, wherein a data channel is allocated for the reception of the at least one missing data packet, and the control message is transmitted over a different channel than the data channel.

15. A communications device comprising:
    a timer that is configured to start in response to determining that at least one packet is missing;
    a buffer for storing received data packets; and
    a processing unit for transferring the stored data packets from the buffer after the timer expires, for determining if at least one data packet is missing, and for deeming the at least one missing data packet as lost in response to receiving a control message before the timer expires.

16. The communications device of claim 15, wherein the control message comprises a field and/or an acknowledge sequence number for identifying the missing data packet.

17. The communications device of claim 15, wherein the control message comprises a packet data unit having a dummy payload and/or a zero payload.

18. The communications device of claim 15, wherein the control message communicates an abortion in transmitting, and/or retransmitting of the at least one missing data packet.

19. The communications devices of claim 15, further comprising:
    means for attempting recovery of the at least one missing data packet using a radio link control layer.

20. The communications device of claim 15, wherein a data channel is allocated for the reception of the at least one missing data packet, and the control message is transmitted over a different channel than the data channel.

* * * * *

UNITED STATES PATENT AND TRADEMARK OFFICE
CERTIFICATE OF CORRECTION

PATENT NO. : 7,403,528 B2
APPLICATION NO. : 10/243443
DATED : July 22, 2008
INVENTOR(S) : Teck H. Hu and Gordon Peter Young It is certified that error appears in the above-identified patent and that said Letters Patent is hereby corrected as shown below:

In column 7, claim 1, line 36, change "staffing" to --starting--.

Signed and Sealed this

Twenty-fourth Day of March, 2009

JOHN DOLL
*Acting Director of the United States Patent and Trademark Office*